United States Patent [19]
Ohnishi et al.

[11] Patent Number: 5,821,002
[45] Date of Patent: Oct. 13, 1998

[54] POLYMERIC FLUORESCENT SUBSTANCE, PRODUCTION PROCESS THEREOF AND ORGANIC ELECTROLUMESCENCE DEVICE

[75] Inventors: Toshihiro Ohnishi; Takanobu Noguchi; Shuji Doi, all of Tsukuba; Makiko Ohshima, Kamakura, all of Japan

[73] Assignee: Sumitomo Chemical Company, Osaka, Japan

[21] Appl. No.: 593,511

[22] Filed: Jan. 30, 1996

[30] Foreign Application Priority Data

Feb. 1, 1995 [JP] Japan .................................. 7-014963
May 19, 1995 [JP] Japan .................................. 7-121303

[51] Int. Cl.$^6$ .......................... H05B 33/00; H05B 33/14; C08G 61/02
[52] U.S. Cl. ................... 428/690; 313/504; 252/301.16; 428/691; 428/917
[58] Field of Search .................................. 428/690, 691, 428/917; 313/504; 252/301.16

[56] References Cited

FOREIGN PATENT DOCUMENTS

| 0637621 | 2/1995 | European Pat. Off. . |
| 0 443 861 B1 | 7/1995 | European Pat. Off. ........ H05B 33/14 |
| 4-103621 | 4/1992 | Japan .............................. C08G 61/02 |
| WO 90/13148 | 11/1990 | WIPO ............................ H01L 33/00 |
| WO92/03490 | 3/1992 | WIPO . |
| WO92/03491 | 3/1992 | WIPO . |
| WO94/29883 | 12/1994 | WIPO . |

*Primary Examiner*—Charles Nold
*Attorney, Agent, or Firm*—Sughrue, Mion, Zinn, Macpeak & Seas, PLLC

[57] ABSTRACT

Disclosed in this specification is a polymeric fluorescent substance which emits a fluorescence in a solid state, contains at least one kind of repeating unit represented by the following formula (1) with the amount of the formula (1) repeating units being at least 50 mole % based on the total repeating units, and has a polystyrene-reduced number-average molecular weight of $10^3$–$10^7$, characterized in that it has a monofunctional group represented by the following formula (2) at at least one terminal of the molecule:

$$-Ar_1-CR_1=CR_2- \qquad (1)$$

[wherein $Ar_1$ is an arylene group or a heterocyclic compound group having 4–20 carbon atoms taking part in conjugated bonds; $R_1$ and $R_2$ each are independently a group selected from the group consisting of a hydrogen atom, an alkyl group of 1–20 carbon atoms, an aryl group of 6–20 carbon atoms, a heterocyclic compound group of 4–20 carbon atoms and a cyano group];

$$-CR_3=CR_4-Ar_2 \qquad (2)$$

[wherein $Ar_2$ is an aryl group or a heterocyclic compound group having 4–50 carbon atoms taking part in conjugated bonds; $R_3$ and $R_4$ each are independently a group selected from the group consisting of a hydrogen atom, an alkyl group of 1–20 carbon atoms, an aryl group of 6–20 carbon atoms, a heterocyclic compound group of 4–20 carbon atoms and a cyano group].

6 Claims, 1 Drawing Sheet

POLYMERIC FLUORESCENT SUBSTANCE, PRODUCTION PROCESS THEREOF AND ORGANIC ELECTROLUMESCENCE DEVICE

CROSS-REFERENCE

The present application relies for priority upon the inventors Japanese Patent Application Nos. 07-014963 filed Feb. 1, 1995 and 07-121303 filed May 19, 1995, the content of which is herein incorporated by reference.

BACKGROUND OF THE INVENTION

1. Field of the Invention

The present invention relates to a polymeric fluorescent substance, a process for producing it, and organic electroluminescence devices (which may hereinafter be referred to as organic EL devices) made by using said polymeric fluorescent substance. More particularly, the present invention relates to a polymeric fluorescent substance having a strong fluorescence and soluble in solvents, a process for producing such a substance, and organic EL devices with high luminous efficiency and long service life made by using said polymeric fluorescent substance.

2. Description of the Related Art

Inorganic electroluminescence devices (which may hereinafter be referred to as inorganic EL devices) using an inorganic fluorescent substance as the light emitting material have been applied to various uses, for example, as a flat light source for backlight of liquid crystal displays and various display devices such as flat panel display and the like. In these devices, however, a high-voltage alternating current has been required for driving the devices.

As the improvements of these inorganic EL devices, there have been reported a device having a double-layer structure comprising a laminate of a light emitting layer made of an organic fluorescent dye and a layer of an organic charge transport compound (U.S. Pat. No. 4,539,507) and the devices using polymers as the light emitting material (WO9013148 and EP-A-0443861). The electroluminescence devices using the organic materials have advantages, such as low-voltage DC drive, high luminance and easy luminescence of a large number of colors, in comparison with the inorganic EL devices.

Regarding the polymeric light emitting materials that have ever been reported, WO9013148 discloses a thin film of poly(p-phenylene vinylene) obtained by forming a film of a soluble precursor on the electrode and subjecting it to a heat treatment to convert the precursor into a conjugated polymer. EP-A-0443861 illustrates conjugated polymers, such as poly-2,5-dialkoxy(p-phenylene vinylene), having a salient feature that they are themselves soluble in solvents and make heat treatment unnecessary.

As a polymer substituted at the terminal of the molecular chain, there has been reported poly(p-phenylene vinylene) having a nitro group at the terminal (JP-A-04-103621). However, no disclosure is made on luminescent properties or EL characteristics of this polymer.

Among other proposed polymeric light emitting materials are a polymeric fluorescent substance containing both a conjugated segment and a non-conjugated segment in the molecule, and a poly-p-phenylene vinylene derivative in which a cyano group is introduced into the vinylene group (Nature, Vol. 365, p. 628, 1993). As the polymeric fluorescent substances having both a conjugated segment and a non-conjugated segment in the molecule, there are known a random copolymer of a 2,5-dimethoxy-p-phenylene ethylene and p-phenylene vinylene (Nature, Vol. 356, p. 47, 1992) and a polymer in which a phenylene vinylene group and an aliphatic hydrocarbon group are coupled via an ether linkage (Macromolecules, Vol. 26, p. 1188, 1993).

However, the heretofore proposed polyarylene vinylene derivatives used for the organic EL devices have been prepared by polycondensing the bifunctional monomers making use of a reaction producing carbon-carbon double bonds. Hitherto, efforts have mainly been made for improving the luminescent properties of the polymeric fluorescent substances by changing their repeating structural units, and there is available no report on the attempt for elongating the service life of the devices by changing the molecular structure of the polymeric fluorescent substances. Analysis of these polymeric fluorescent substances indicated that, in some cases, there remains a polymerizable group at the terminal of the molecule of the polymer obtained from polycondensation. The influence of the presence of such an active group at the polymer terminal is not known, but there is a possibility that the active terminal group might be activated in the organic EL device on electrification or emission of light to cause a change of the luminescent properties of the device. There has, however, been known no polymeric fluorescent substance whose terminal molecular structure has been converted into a stable one. Thus, a substance having high quantum yield of fluorescence and showing high luminous efficiency and high stability when used for an organic EL device has been desired.

SUMMARY OF THE INVENTION

An object of the present invention is to provide a polymeric fluorescent substance which is soluble in solvents and has high quantum yield of fluorescence and high stability; a process for producing such a polymeric fluorescent substance; and organic EL devices with high luminous efficiency and long service life which can easily be produced using said polymeric fluorescent substance by coating.

In view of the above situation, the present inventors made researches for the improvement of luminous efficiency and service life of the organic EL devices using a polymeric fluorescent substance for the light emitting layer, and as a result, found that a polymeric fluorescent substance having conjugated bonds in the main chain and also having an aryl group or a heterocyclic compound group at the terminal of the molecular chain shows a high quantum yield of fluorescence, that an organic EL device can easily be produced using said polymeric fluorescent substance by coating, and that this organic EL device has high luminous efficiency and long service life. The above finding has led to the completion of the present invention.

The present invention includes the following embodiments.

(1) A polymeric fluorescent substance which emits a fluorescence in a solid state, contains at least one kind of repeating unit represented by the following formula (1), with the amount of the formula (1) repeating units being at least 50 mole % based on the total repeating units, and has a polystyrene-reduced number-average molecular weight of $10^3$–$10^7$, wherein said polymeric fluorescent substance has a monofunctional group represented by the following formula (2) on at least one terminal of the molecule:

$$—Ar_1—CR_1=CR_2— \qquad (1)$$

[wherein $Ar_1$ is an arylene group or a heterocyclic compound group having 4–20 carbon atoms taking part in conjugated bonds; and $R_1$ and $R_2$ each represent independently a group selected from the group consisting of a hydrogen atom, an alkyl group of 1–20 carbon atoms, an aryl group of 6–20 carbon atoms, a heterocyclic compound group of 4–20 carbon atoms and a cyano group];

$$—CR_3=CR_4—Ar_2 \qquad (2)$$

[wherein $Ar_2$ is an aryl group or a heterocyclic compound group having 4–50 carbon atoms taking part in conjugated bonds; and $R_3$ and $R_4$ each represent independently a group selected from the group consisting of a hydrogen atom, an alkyl group of 1–20 carbon atoms, an aryl group of 6–20 carbon atoms, a heterocyclic compound group of 4–20 carbon atoms or a cyano group].

(2) A process for producing a polymeric fluorescent substance set forth in (1), which comprises polymerizing at least one monomer represented by the following formula (3) to obtain a polymer, and reacting the resulting polymer with a compound of the following formula (4):

$$G_1—Ar_1—G_2 \qquad (3)$$

[wherein $Ar_1$ is an arylene group or a heterocyclic compound group having 4–20 carbon atoms taking part in conjugated bonds; and $G_1$ and $G_2$ each represent independently a group which includes a group selected from the group consisting of a hydrogen atom, an alkyl group of 1–20 carbon atoms, an aryl group of 6–20 carbon atoms, a heterocyclic compound group of 4–20 carbon atoms and a cyano group, said groups $G_1$ and $G_2$ each forming a carbon-carbon double bond in the polymerization];

$$G_3—Ar_2 \qquad (4)$$

[wherein $Ar_2$ is an arylene group or a heterocyclic compound group having 4–50 carbon atoms taking part in the conjugated bonds; and $G_3$ is a group which includes a group selected from the group consisting of a hydrogen atom, an alkyl group of 1–20 carbon atoms, an aryl group of 6–20 carbon atoms, a heterocyclic compound group of 4–20 carbon atoms and a cyano group, said group $G_3$ being reacted with $G_1$ and/or $G_2$ in the formula (3) to form a carbon-carbon double bond].

(3) An organic electroluminescence device having at least a light emitting layer between the electrodes consisting of one pair of an anode and a cathode, at least one of which electrodes is transparent or semitransparent, wherein said light emitting layer comprises a polymeric fluorescent substance set forth in (1).

PREFERRED EMBODIMENTS OF THE INVENTION

Figure 1:
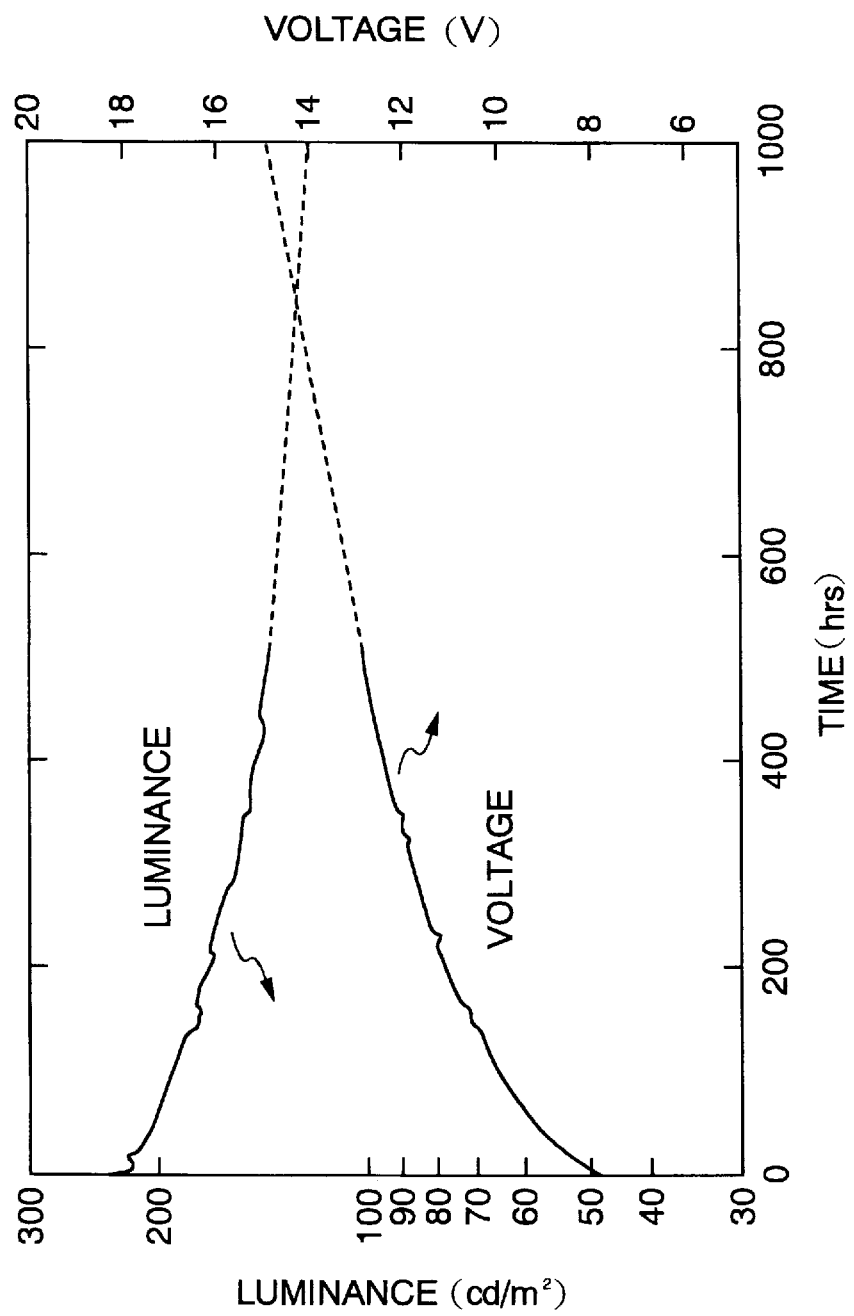
FIG. 1 is a graph showing change of luminance and voltage with time in consecutive drive of the organic electroluminescence device of Example 4 of the present invention at 2.5 mA/cm². The solid portion of each curve, covering the period up to 500th hour from the start of the drive, shows the measured value while the dash part covering the period from 500th to 1,000th hour is extrapolated to a straight line.

The present invention is hereinafter described in detail.

The polymeric fluorescent substance represented by the formula (1) according to the present invention can be obtained from a polycondensation reaction forming carbon-carbon double bonds. $Ar_1$ in the formula (1) is a bivalent arylene group or a heterocyclic compound group having 4–20 carbon atoms taking part in conjugated bonds. $Ar_1$ preferably has at least one ring structure selected from the group consisting of a 6-membered ring consisting of carbon and hydrogen alone, a 6-membered ring consisting of carbon, hydrogen and nitrogen, and a 5-membered ring consisting of carbon, hydrogen and at least one of oxygen, nitrogen and sulfur, or a condensed ring containing said ring structure. The "condensed ring" refers to a combination of two or more rings sharing two or more atoms with each other.

Specific examples of $Ar_1$ are bivalent aromatic compound groups represented by the following formulae (5), derivatives thereof, and the groups comprising combinations of said groups:

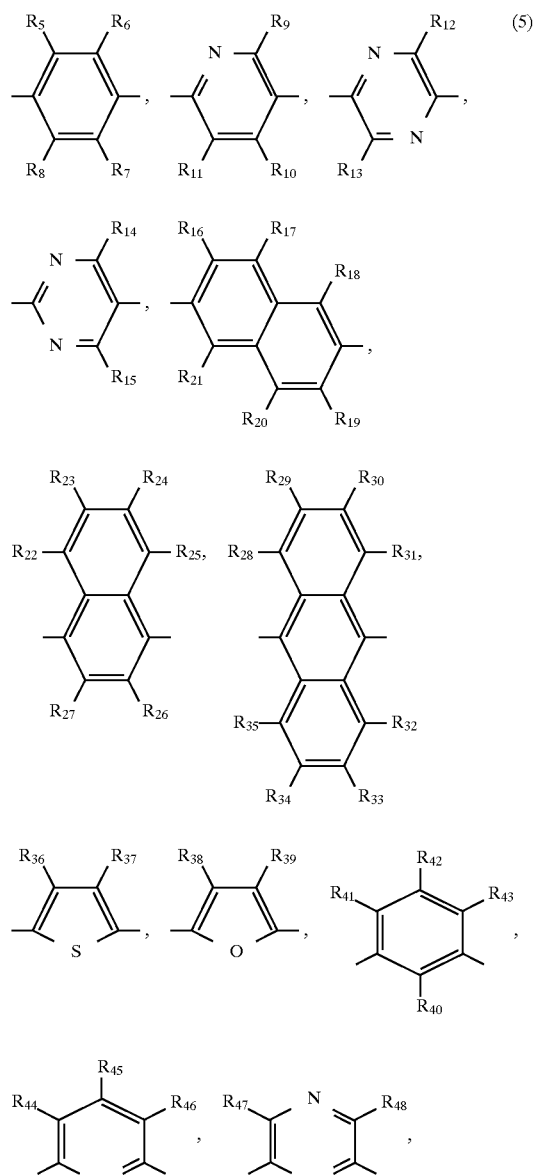

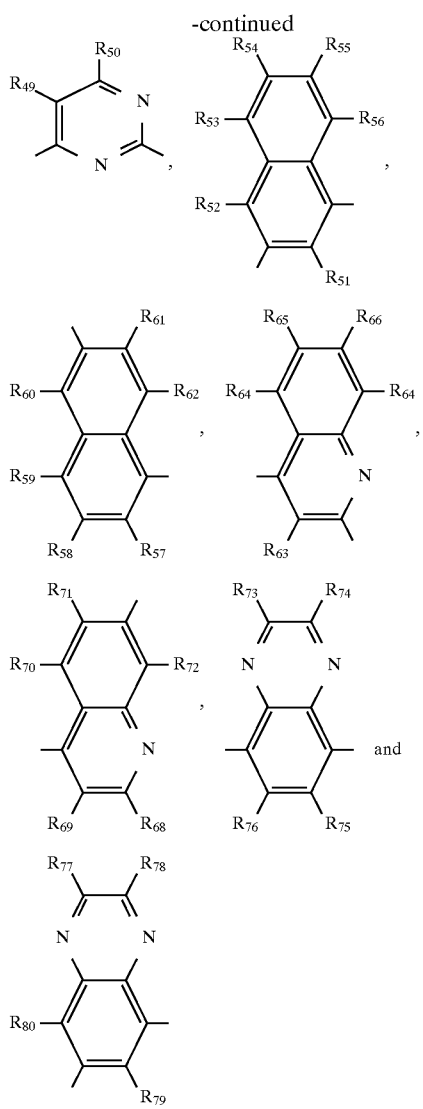

[wherein $R_5$ to $R_{80}$ are independently a group selected from the group consisting of a hydrogen atom, a cyano group, an alkyl, alkoxyl or alkylthio group of 1–20 carbon atoms, an aryl or aryloxy group of 6–18 carbon atoms, and a heterocyclic compound group of 4–14 carbon atoms].

Of these groups, preferable are 1,4-phenylene group, 4,4'-biphenylene group, 2,6-naphthylene group, 9,10-anthrylene group, 2,5-pyridinediyl group, 2,5-thienylene group, nuclear substitution derivatives thereof, 1,3-phenylene group, 1,3-naphthylene group, 2,6-pyridinediyl group, 2,4-quinolinediyl group and derivatives thereof. More preferable are 1,4-phenylene group, 4,4'-biphenylene group, 2,5-pyridinediyl group, 2,5-thienylene group, 1,3-phenylene group, 2,6-pyridinediyl group, 2,4-quinolinediyl group, and derivatives thereof. One or more of these groups may be selected.

$R_1$ and $R_2$ bonded to the vinylene groups in the repeating unit of the formula (1) are independently a group selected from the group consisting of a hydrogen atom, an alkyl group of 1–20 carbon atoms, an aryl group of 6–20 carbon atoms, a heterocyclic compound group of 4–20 carbon atoms and a cyano group.

The alkyl group of 1–20 carbon atoms include methyl group, ethyl group, propyl group, butyl group, pentyl group, hexyl group, heptyl group, octyl group, decyl group, dodecyl group, etc. Of these, preferable are methyl group, ethyl group, pentyl group, hexyl group, heptyl group and octyl group.

The aryl group is exemplified by phenyl group, 4-$C_1$–$C_{14}$ alkoxyphenyl groups ($C_1$–$C_{14}$ refers to 1–14 carbon atoms), 4-$C_1$–$C_{14}$ alkylphenyl groups, 1-naphthyl group and 2-naphthyl group.

The heterocyclic compound group is exemplified by 2-pyridyl group and 2-quinolyl group.

The monofunctional groups that can be bonded to the terminal of the molecule of the polymeric fluorescent substance according to the present invention are those represented by the formula (2) shown above. The polymeric fluorescent substance of the present invention may contain a polymer having a terminal group of a structure other than that of the formula (2) within limits not affecting the object of the present invention.

$Ar_2$ in the terminal group of the formula (2) in the polymeric fluorescent substance of the present invention is an aryl group or a heterocyclic compound group having 4–50 carbon atoms taking part in conjugated bonds. $Ar_2$ preferably has at least one ring structure selected from the group consisting of a 6-membered ring consisting of carbon and hydrogen alone, a 6-membered ring consisting of carbon, hydrogen and nitrogen, and a 5-membered ring consisting of carbon, hydrogen and at least one of oxygen, nitrogen and sulfur, or a condensed ring containing said ring structure. The "condensed ring" refers to a combination of two or more rings sharing two or more atoms with each other.

Specific examples of $Ar_2$ are monovalent aromatic compound groups represented by the following formulae (6) and derivatives thereof:

-continued
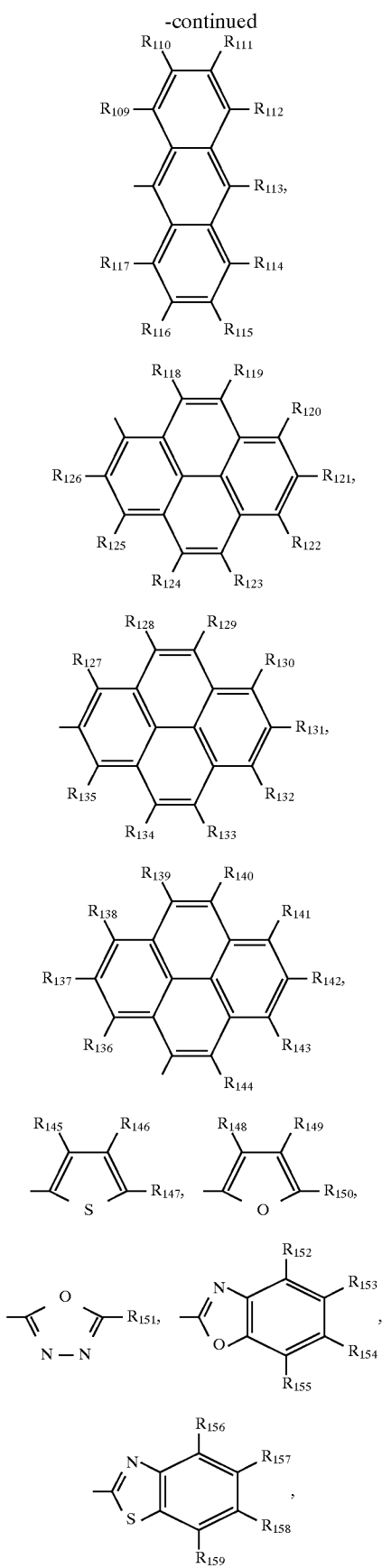
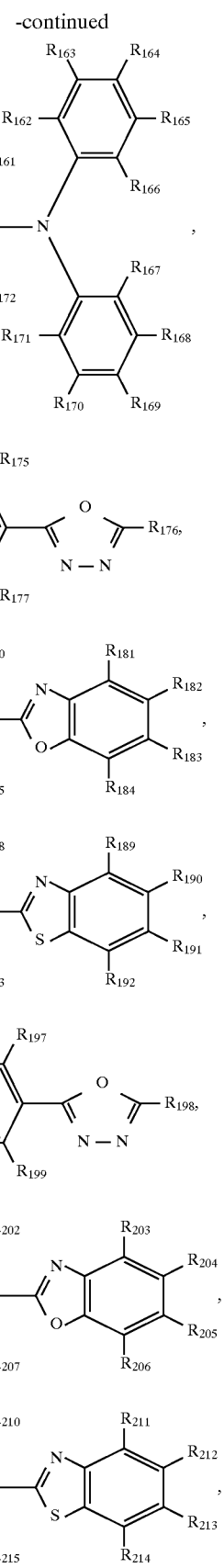

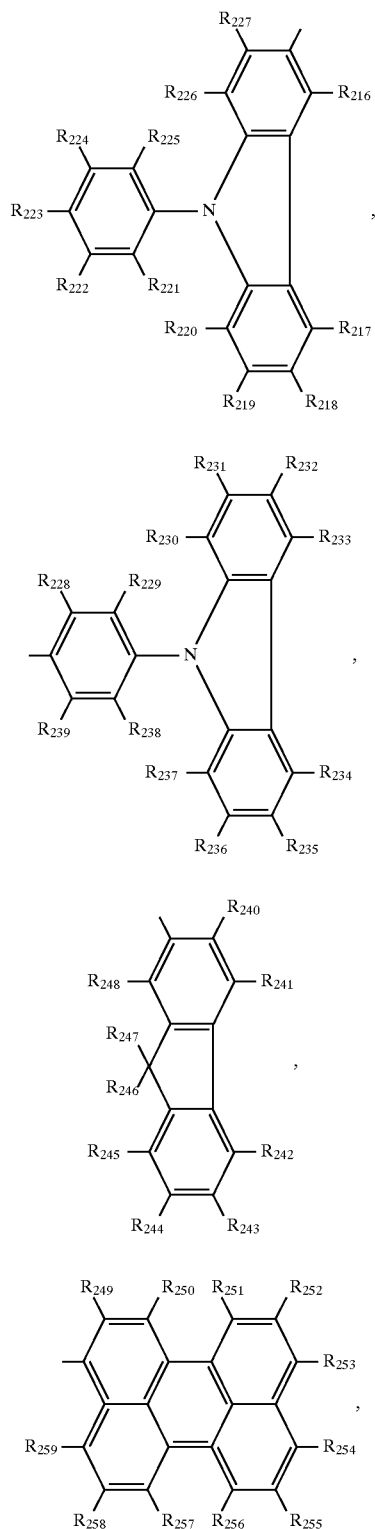

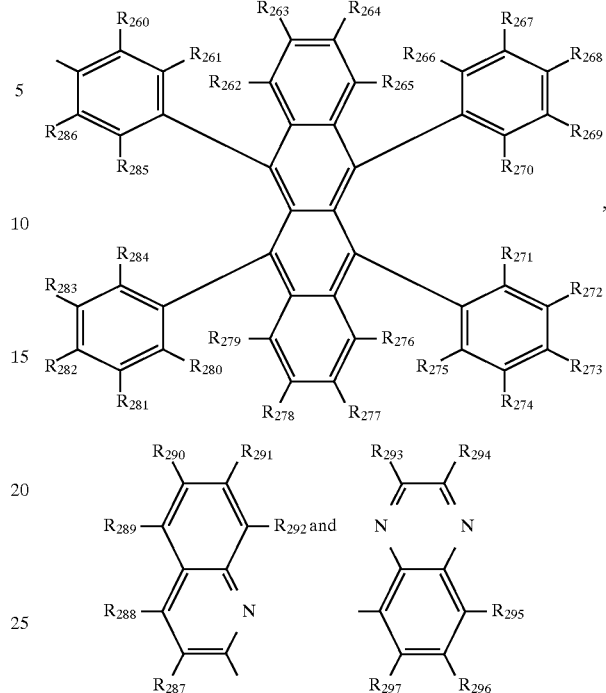

[wherein $R_{80}$ to $R_{297}$ are independently a group selected from the group consisting of a hydrogen atom, a cyano group, an alkyl, alkoxyl or alkylthio group of 1–20 carbon atoms, an aryl or aryloxy group of 6–18 carbon atoms, and a heterocyclic compound group of 4–14 carbon atoms].

Of these, preferable are phenyl group, 1-naphthyl group, 9-anthryl group, 2-pyridyl group, 2-thienyl group, oxadiazolyl group, benzoxazolyl group, 4-(N,N-diphenylamino) phenyl group, 1-pyrenyl group, 2-pyrenyl group, 4-pyrenyl group, 2-fluorenyl group, 2-quinolyl group, 4-(9-carbazolyl) phenyl group, 9-phenyl-3-carbazolyl group and derivatives thereof.

More preferable are 1-naphthyl group, 9-anthryl group, oxadiazolyl group, 4-(N,N-diphenylamino)phenyl group, 1-pyrenyl group, 2-pyrenyl group, 2-fluorenyl group, 2-quinolyl group, 4-(9-carbazolyl)phenyl group, 9-phenyl-3-carbazolyl group and derivatives thereof. 1-naphthyl group, 9-anthryl group, 1-pyrenyl group, 2-pyrenyl group and derivatives thereof are particularly preferable.

$R_3$ and $R_4$ bonded to the vinylene groups in the terminal group of the formula (2) are independently a group selected from the group consisting of a hydrogen atom, an alkyl group of 1–20 carbon atoms, an aryl group of 6–20 carbon atoms, a heterocyclic compound group of 4–20 carbon atoms and a cyano group.

Specifically, the alkyl group of 1–20 carbon atoms include methyl group, ethyl group, propyl group, butyl group, pentyl group, hexyl group, heptyl group, octyl group, decyl group, dodecyl group, etc. Of these, preferable are methyl group, ethyl group, pentyl group, hexyl group, heptyl group and octyl group.

The aryl group is exemplified by phenyl group, $4C_1$–$C_{14}$ alkoxyphenyl group, 4-$C_1$–$C_{14}$ alkylphenyl group, 1-naphthyl group and 2-naphthyl group.

The heterocyclic compound group is exemplified by 2-pyridyl group and 2-quinolyl group.

The polymeric fluorescent substance of the present invention emits a fluorescence in a solid state and contains at least one kind of repeating unit represented by the formula (1) with the amount of the formula (1) repeating units being at least 50 mole % based on the total repeating units. Preferably, the amount of the formula (1) repeating units is at least 70 mole % based on the total repeating units although the structure of the repeating unit must be taken into account.

The polymerization degree of the polymeric fluorescent substance of the present invention is not particularly restricted as far as the substance has a polystyrene-reduced molecular weight of $10^3$–$10^7$, and varies depending on the constitution and proportions of the repeating units contained in the substance. In view of the film-forming properties of the substance, the appropriate polymerization degree is generally 4–10,000, preferably 5–3,000, more preferably 8–2,000 in terms of the total number of the repeating units. Herein, the molecular weight refers to a polystyrene-reduced number-average molecular weight measured by gel permeation chromatography (GPC) using chloroform as solvent.

The polymeric fluorescent substance of the present invention may be a random, block or graft copolymer, or a polymer having a structure intermediate between those of said copolymers, for example, a block-type random copolymer. In order to obtain a high quantum yield of fluorescence, a block-type random copolymer or a block or graft copolymer is preferred to a wholly random copolymer. In case the backbone of the polymer is branched to provide three of more terminals, it is also desirable that the polymer has the terminal group of the formula (2).

The polymeric fluorescent substance of the present invention can be made into a film by dissolving the substance in a solvent, but in order to obtain a polymer having higher solubility in solvents and better film-making property, it is preferable that each conjugated moiety of the main chain of the polymer has at least one aryl or heterocyclic compound group with its ring substituted with at least one substituent selected from the group consisting of alkyl, alkoxyl or alkylthio groups of 4–20 carbon atoms, aryl or aryloxy groups of 6–20 carbon atoms and heterocyclic compound groups of 4–20 carbon atoms.

The substituents are exemplified by the followings. The alkyl group of 4–20 carbon atoms includes butyl group, pentyl group, hexyl group, heptyl group, octyl group, decyl group, dodecyl group, etc. Of these, preferable are pentyl group, hexyl group, heptyl group and octyl group.

The alkoxyl group of 4–20 carbon atoms includes butoxyl group, pentyloxy group, hexyloxy group, heptyloxy group, octyloxy group, decyloxy group, dodecyloxy group, etc. Of these, preferable are pentyloxy group, hexyloxy group, heptyloxy group and octyloxy group.

The alkylthio group of 4–20 carbon atoms includes butylthio group, pentylthio group, hexylthio group, heptylthio group, octylthio group, decylthio group, dodecylthio group, etc. Of these, preferable are pentylthio group, hexylthio group, heptylthio group and octylthio group.

The aryl group of 6–20 carbon atoms is exemplified by phenyl group, 4-$C_1$–$C_{14}$ alkoxyphenyl group ($C_1$–$C_{14}$ refer to 1–14 carbon atoms), 4-$C_1$–$C_{14}$ alkylphenyl group, 1-naphthyl group and 2-naphthyl group.

The aryloxy group of 6–20 carbon atoms is exemplified by phenoxy group.

The heterocyclic compound group is exemplified by 2-thienyl group, 2-pyrrolyl group, 2-furyl group and 2-, 3- or 4-pyridyl group.

The number of the substituents varies depending upon the molecular weight of the desired polymer and the constitution of the repeating units contained in the polymer. However, in order to obtain a copolymer of high solubility, the number of the substituents is preferably one or more per molecular weight of 600.

The good solvent for the polymeric fluorescent substance is exemplified by halogen-containing hydrocarbons, aromatic hydrocarbons and cyclic ether type compounds. Typical examples of such solvents are chloroform, methylene chloride, dichloroethane, tetrahydrofuran, toluene and xylene. The polymeric fluorescent substance can be dissolved in these solvents in an amount of generally 0.1% by weight or more although the amount varies depending upon the structure and molecular weight of the polymer.

In manufacture of an organic EL device, when a film is formed from a solution using the polymeric fluorescent substance soluble in these organic solvents, it is simply required to apply the solution and then dry it to remove the solvent. This simple operation can also be applied when a charge transport material such as mentioned below is mixed in the fluorescent substance.

The process for producing the polymeric fluorescent substance according to the present invention comprises the steps of synthesizing a polymer having a repeating unit of the formula (1) by a carbon-carbon double bond forming reaction, and then forming a terminal group of the formula (2). For the reaction for forming carbon-carbon double bonds in the present invention, there can be employed, for example, a Wittig reaction, a dehydrohalogenation process, a sulfonium salt decomposition process and a Knoevenagel reaction.

The above polymerization operation is carried out using one or more of the compounds having two polymerizable groups of the formula (3).

$G_1$ and $G_2$ in the formula (3) are properly selected according to the reaction employed for forming carbon-carbon double bonds.

In the Wittig reaction, for instance, a compound of the formula (3) wherein $G_1$ and $G_2$ are aldehyde groups and a compound in which $G_1$ and $G_2$ are phosphonium salts are reacted. For example, a dialdehyde compound of the following formula (7) and a diphosphonium salt compound of the following formula (8) are reacted. $Ar_3$ and $Ar_4$ may be a same group or different groups. In case $Ar_3$ and $Ar_4$ are different groups, an alternating copolymer can be obtained. When using two or more types of dialdehyde compound and/or two or more types of diphosphonium salt compound, a copolymer containing all units generated from all of these monomers can be obtained. OHC—$Ar_3$—CHO (7)

$(C_6H_5)_3P^+CH_2—Ar_4—CH_2P^+(C_6H_5)_3$

[wherein $Ar_3$ and $Ar_4$ are each selected from the groups represented by $Ar_1$ in the formula (1) and $X_1^-$ is a counter ion exemplified by halogenide ions, etc.).

In the dehydrohalogenation process, an aromatic compound of the following formula (9) having the halogenated methyl groups attached to both ends is polycondensed:

$X_2R_{298}HC—Ar_5—CHR_{299}X_2$ (9)

[wherein $Ar_5$ is a group synonymous with the group represented by $Ar_1$ in the formula (1); $X_2$ is a halogen atom; and $R_{298}$ and $R_{299}$ are independently a group selected from the group consisting of a hydrogen atom, a cyano group, an alkyl group of 1–20 carbon atoms, an aryl group of 6–18 carbon atoms and a heterocyclic compound group of 4–14 carbon atoms].

In the sulfonium salt decomposition process, an aromatic compound of the following formula (10) having the sulfonium salts attached to both ends is polycondensed:

$$X_3^- R_{300} R_{301} S^+ R_{302} HC\text{—}Ar_6\text{—}CHR_{303} S^+ R_{304} R_{305} X_3^- \qquad (10)$$

[wherein $Ar_6$ is a group synonymous with the group represented by $Ar_1$ in the formula (1); $X_3$ is a halogen atom; $R_{302}$ and $R_{303}$ are independently a group selected from the group consisting of a hydrogen atom, a cyano group, an alkyl, alkoxyl or alkylthio group of 1–20 carbon atoms, an aryl or aryloxy group of 6–18 carbon atoms and a heterocyclic compound group of 4–14 carbon atoms; $R_{300}$ and $R_{301}$, and $R_{304}$ and $R_{305}$ are independently an alkyl group of 1–10 carbon atoms, or $R_{300}$ and $R_{301}$, and $R_{304}$ and $R_{305}$ are independently a cycloalkyl group of 4 or more carbon atoms having a ring structure].

In the Knoevenagel reaction, a process similar to those described in J. Org. Chem., Vol. 25, p. 813 (1959); Makromol. Chem. Vol. 74, p. 71 (1964); etc., can be employed to obtain a copolymer.

Specifically, a dialdehyde compound represented by the following formula (11) and a compound represented by the following formula (12) are polycondensed:

$$OHC\text{—}Ar_7\text{—}CHO \qquad (11)$$

$$R_{306} H_2 C\text{—}Ar_8\text{—}CH_2 R_{307} \qquad (12)$$

[wherein $Ar_7$ and $Ar_8$ are independently a group synonymous with the group represented by $Ar_1$ in the formula (1); and $R_{306}$ and $R_{307}$ are independently a group selected from the group consisting of a hydrogen atom, a cyano group, an alkyl, alkoxy or alkylthio group of 1–20 carbon atoms, an aryl or aryloxy group of 6–18 carbon atoms, and a heterocyclic compound group of 4–14 carbon atoms].

More specifically, a corresponding diacetonitrile compound, for example, m-phenylenediacetonitrile, and a corresponding dialdehyde compound, for example, 2,5-dioctyloxyterephthalaldehyde, are polymerized in an ethyl alcohol/chloroform mixed solvent in the presence of sodium methoxide. When two or more types of diacetonitrile and/or two or more types of dialdehyde compounds are reacted, it is possible to obtain a copolymer of all units generated from all of said monomers. Further, since each of the Wittig reaction and the Knoevenagel reaction can be conducted by using lithium ethoxide or the like, a reaction using a dialdehyde compound(s), a diphosphonium compound(s) and a diacetonitrile compound(s) in appropriate amounts can produce a copolymer of all of these monomers.

After the polymerization, the active terminal group is reacted with a monofunctional compound of the formula (4). The group $G_3$ in the formula (4) is properly selected according to the reaction to be performed or, in case two types of monomers differing in functional group are polycondensed, according to the amount of the monomers used in the reaction. In the case of the Wittig reaction, because of the phosphonium salt or aldehyde terminal, an aldehyde group or a phosphonium salt is selected as the group represented by $G_3$ in the formula (4). The terminal is constituted by a halogenated methyl group in the dehydrohalogenation process, a sulfonium salt group in the sulfonium salt decomposition process, and an aldehyde group or an active methylene group (e.g. acetonitrile group) in the Knoevenagel reaction, so that a group reactive with the polymerization terminal in each process is selected as $G_3$ for reacting the compound of the formula (4).

Of these processes, the process using the Wittig reaction or the Knoevenagel reaction is preferable in view of the reaction control and yield.

A process for the synthesis of an arylene vinylene copolymer, which is a typical example of polymeric fluorescent substance of the present invention, is explained below.

For obtaining an arylene vinylene copolymer by making use of the Wittig reaction, a bis(halogenated methyl) compound (e.g. 2,5-dioctyloxy-p-xylene dibromide) is reacted with triphenylphosphine in N,N-dimethylformamide, a solvent, to synthesize a phosphonium salt, and this salt is subjected to condensation with a dialdehyde compound containing a formula (1) structure, for example, terephthalaldehyde in ethyl alcohol in the presence of lithium ethoxide to obtain an arylene vinylene copolymer. When two or more types of diphosphonium salt and/or two or more types of dialdehyde compound are reacted, it is possible to obtain a copolymer of all of these monomers.

A terminal-substituted copolymer can be obtained utilizing the Wittig reaction by reacting a halogenated methyl compound having a formula (2) structure, for example, 9-chloromethylnaphthalene, with triphenylphosphine in N,N-dimethylformamide to synthesize a phosphonium salt, and condensing this salt with the previously obtained aldehyde-terminated arylene vinylene copolymer in the same way as described above, for example, in ethyl alcohol in the presence of lithium ethoxide.

When the thus produced polymer is used as a light emitting material of an organic EL device, the purity of the polymer has an influence on the luminous property of the device. It is, therefore, desirable that the polymer after synthesis is subjected to purification treatments such as reprecipitation, chromatographic separation, etc.

Regarding the structure of the organic EL device produced by using the polymeric fluorescent substance of the present invention, no specific restrictions are imposed and a known structure can be employed as long as a light emitting material comprising said polymeric fluorescent substance is used in the light emitting layer provided between a pair of electrodes at least one of which is transparent or semitransparent.

Examples of said structure include one in which a pair of electrodes are provided on both sides of the light emitting layer comprising the polymeric fluorescent substance or comprising a mixture of the polymeric fluorescent substance and a charge transport material (which is a generic name for electron transport material and hole transport material), and one in which an electron transport layer containing an electron transport material is laminated between a cathode and a light emitting layer and/or in which a hole transport layer containing a hole transport material is laminated between an anode and a light emitting layer.

The light emitting layer and the charge transport layer may each be provided as a single layer or as a combination of two or more layers, all of which embodiments are embraced in the scope of the present invention. Further, a light emitting material (or materials) other than the polymeric fluorescent substance, such as mentioned below, may be mixed in the light emitting layer. Also, the light emitting layer and/or charge transport layer may be formed by dispersing the polymeric fluorescent substance and/or charge transport material in a polymeric compound.

As for the charge transport material, i.e., electron transport material or hole transport material, used with a polymeric fluorescent substance of the present invention, such a material is not specified and known types can be used in the present invention. For example, as the hole transport material, there can be used pyrazoline derivatives, arylamine derivatives, stilbene derivatives, triphenyldiamine derivatives, etc. As the electron material, there can be used oxadiazole derivatives, anthraquinodimethane and its derivatives, benzoquinone and its derivatives, naphthoquinone and its derivatives, anthraquinone and its derivatives, tetracyanoanthraquinodimethane and its derivatives, fluorenone derivatives, diphenyldicyanoethylene and its derivatives, diphenoquinone derivatives, metal complexes of 8-hydroxyquinoline and its derivatives, etc.

More concrete examples of these materials are shown in JP-A-63-70257, JP-A-63-175860, JP-A-2-135359, JP-A-2-135361, JP-A-2-209988, JP-A-3-37992 and JP-A-3-152184. As the hole transport material, triphenyldiamine derivatives are preferably used, and as the electron transport material, oxadiazole derivatives, benzoquinone and its derivatives, anthraquinone and its derivatives, and metal complexes of 8-hydroxyquinoline and its derivatives are preferably used. More specifically, 4,4'-bis(N-(3-methylphenyl)-N-phenylamino)-biphenyl is preferred as the hole transport material, and 2-(4-biphenylyl)-5-(4-t-butylphenyl)-1,3,4-oxadiazole, benzoquinone, anthraquinone and tris(8-quinolinol)aluminum are preferred as the electron transport material.

In the present invention, one of these electron transport and hole transport compounds may be used, or both of electron transport and hole transport compounds may be used together. Also, these compounds may be used either singly or as a mixture of two or more of them.

When a charge transport layer (which is a generic name for hole transport layer and electron transport layer) is provided between a light emitting layer and an electrode, a charge transport material such as mentioned above is used singly, or it is mixed with a binder polymer to form a charge transport layer.

When a charge transport material is mixed in the light emitting layer, the amount thereof used varies depending upon the type of the compound used and other factors, so that it is properly decided considering these factors within such an amount range that the film-forming property and the luminous property of the compound are not impaired. Usually, the charge transport material is used in an amount of 1 to 40% by weight, preferably 2–30% by weight based on the light emitting material.

The light emitting material usable in admixture with a polymeric fluorescent substance of the present invention may be well-known ones in the art and is not specified; for example, the light emitting material includes naphthalene derivatives, anthracene and its derivatives, perylene and its derivatives, dyes such as polymethine dyes, xanthene dyes, coumarin dyes, cyanine dyes, etc., metal complexes of 8-hydroxyquinoline and its derivatives, aromatic amines, tetraphenylcyclopentadiene and its derivatives, tetraphenylbutadiene and its derivatives, and the like. Specifically, those disclosed in JP-A-57-51781, JP-A-59-194393, etc. and known in the art can be used.

The amount of the light emitting material used varies depending upon the type of the compound used and other factors, so that it is properly decided considering these factors within such an amount range that the film-forming property and the luminous property of the compound are not impaired. Usually, the light emitting material is used in an amount of 0.01 to 10% by weight, preferably 0.1 to 3% by weight based on the polymeric fluorescent substance.

A typical process for producing an organic EL device using a polymeric fluorescent substance of the present invention is described below.

A pair of transparent or semi-transparent electrodes, consisting of an anode and a cathode, are provided on a transparent substrate made of glass, transparent plastic or the like.

As the anode material, a conducting metal oxide film, a semi-transparent thin metallic film or the like is used. Specifically, a film formed by using indium tin oxide (ITO), conductive glass made of tin oxide or the like (such as NESA), or a film of Au, Pt, Ag, Cu or the like is used. The film is formed by a known film forming technique such as vacuum deposition, sputtering, plating or the like.

On this anode is formed a light emitting layer containing, as a light emitting material, the above-mentioned polymeric fluorescent substance or said substance and a charge transport material. This light emitting layer can be formed by applying the light emitting material in the form of a melt, a solution or a mixed solution with a charge transport material by a known coating method such as spin coating, casting, dipping, bar coating, roll coating, gravure coating, microgravure coating, spray coating, die coating, screen printing, etc. It is, however, preferable to form a film by applying a solution or a mixed solution using such coating means as spin coating, casting, dipping, bar coating, roll coating, gravure coating, microgravure coating, spray coating, die coating or screen printing.

The thickness of the light emitting layer is 1 nm to 1 $\mu$m, preferably 2 to 500 nm. A thickness in the range of 5 to 200 nm is preferred for achieving large current density and high luminous efficiency. When a thin film is formed by said coating method, the film is preferably dried by heating at 30°–300° C., preferably 60°–200° C., under reduced pressure or in an inert atmosphere for removing the solvent.

When said light emitting layer is laminated on a charge transport layer, it is preferable that a hole transport layer is formed on the anode before the light emitting layer is provided by the above coating method, and/or after the light emitting layer is provided, an electron transport layer is formed thereon.

The method for forming the charge transport layer is not specified in the present invention; for example, the charge transport layer may be formed by vacuum deposition of a charge transport material in a powdery form, or by applying a solution of said material by an appropriate coating method such as spin coating, casting, dipping, bar coating, roll coating, gravure coating, microgravure coating, spray coating, die coating or screen printing, or by mixing and dispersing a polymeric compound and a charge transport material in a molten state or a state of solution and then coating the suspension by a suitable coating method such as spin coating, casting, dipping, bar coating, roll coating, gravure coating, microgravure coating, spray coating, die coating or screen printing.

The polymeric compound to be mixed is a binder polymer or a charge transporting polymeric compound. It is not specified, but preferably is a polymer which does not impede charge transport to any significant degree. Also, a polymer which does not have strong visible light absorbance is preferably used.

A polymer having a charge-transporting property can be used in the charge transport layer without mixed with a low-molecular weight charge transport material.

Examples of said binder polymer or the polymeric compound having a charge-transporting property are poly(N-vinylcarbazole), polyaniline and its derivatives, polythiophene and its derivatives, poly(p-phenylene vinylene) and its derivatives, poly(2,5-thienylene vinylene) and its derivatives, polycarbonates, polyacrylates, polymethyl methacrylates, polystyrenes, polyvinyl chloride, and polysiloxanes. For forming the film, a coating method is preferably employed because of easy formation of the film.

The thickness of the charge transport layer needs to be large enough to prevent formation of pinholes, but too large a thickness is undesirable because it increases device resistance, requiring a high drive voltage. In view of this, the recommended thickness of the charge transport layer is 1 nm to 1 μm, preferably 2 to 500 nm, more preferably 5 to 200 nm.

Then an electrode is provided on the light emitting layer or electron transport layer. This electrode serves as an electron injection cathode. The material thereof is not specified, but a material with small work function is preferred. There can be used, for example, Al, In, Mg, Ca, Li, Mg—Ag alloy, In—Ag alloy, Mg—In alloy, Mg—Al alloy, Mg—Li alloy, Al—Li alloy and graphite thin film. Vacuum deposition, sputtering or other suitable techniques may be used for forming the cathode.

According to the present invention, not only chemical and thermal stability but also quantum yield of fluorescence is improved by substituting the terminal polymerizable group of a polymeric fluorescent substance with an inactive group, and an excellent polymeric fluorescent substance can be obtained. Also, since a light emitting layer with excellent uniformity can be easily formed with said polymeric fluorescent substance by coating, it is possible to produce an organic EL device with high luminous efficiency and long service life very easily.

The present invention is hereinafter described in more detail by way of Examples. However, the present invention is not restricted to these Examples.

In the present invention, number-average molecular weight refers to a polystyrene-reduced number-average molecular weight as measured by gel permeation chromatography (GPC) using chloroform as a solvent.

REFERENTIAL EXAMPLE 1

[Synthesis of polymeric fluorescent substance A)

2,5-Dioctyloxy-p-xylene dichloride was reacted with triphenylphosphine in N,N-dimethylformamide, a solvent, to synthesize a phosphonium salt. In chloroform were dissolved 9.56 parts by weight of the phosphonium salt and 1.74 parts by weight of terephthalaldehyde. To the resulting solution was dropwise added an ethyl alcohol solution containing 1.56 parts by weight of lithium ethoxide. The mixture was subjected to polymerization at room temperature for 3 hours and allowed to stand overnight at room temperature. After adding ion exchange water and ethyl alcohol, the solution was concentrated and dissolved in chloroform. Ethyl alcohol was added to the solution for reprecipitation. The resulting precipitate was dried under reduced pressure to obtain 3.02 parts by weight of a polymer. This polymer is referred to as polymeric fluorescent substance A.

$^1$H-NMR spectrum of the polymeric fluorescent substance A showed a signal specific to aldehyde group at 9.94 ppm. From a comparison of the integral value of aldehyde protons and the integral value of methylene protons combined with the oxygen atoms, the number-average polymerization degree n of the polymeric fluorescent substance A was determined to be 5.3.

The repeating unit and its terminal structure of the polymeric fluorescent substance A are shown in the following formula (13):

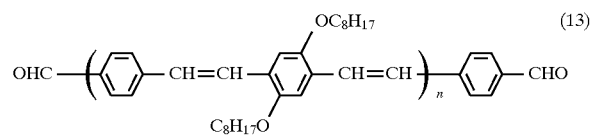

The polystyrene-reduced number-average molecular weight of the polymeric fluorescent substance A was 2.20× $10^3$. The number-average polymerization degree n as determined from the polystyrene-reduced number-average molecular weight was 4.5, which almost agreed with the value determined from the $^1$H-NMR spectrum.

EXAMPLE 1

Synthesis of polymeric fluorescent substance 1

9-Chloromethylnaphthalene was reacted with triphenylphosphine in N,N-dimethylformamide to synthesize a phosphonium salt. 2.24 parts by weight of the phosphonium salt and 2.00 parts by weight of the polymeric fluorescent substance A obtained in Referential Example 1 were dissolved in toluene and ethanol. To the resulting solution was dropwise added an ethyl alcohol solution containing 0.80 parts by weight of lithium ethoxide. The mixture was polymerized at room temperature for 3 hours and allowed to stand overnight at room temperature. After adding ion exchange water and ethyl alcohol, the solution was concentrated and dissolved in toluene. To the solution was added ethyl alcohol for reprecipitation. The resulting precipitate was dried under reduced pressure to obtain 1.11 parts by weight of a polymer. This polymer is referred to as polymeric fluorescent substance 1. The repeating unit and its terminal structure of the polymeric fluorescent substance 1 are shown in the following formula (14):

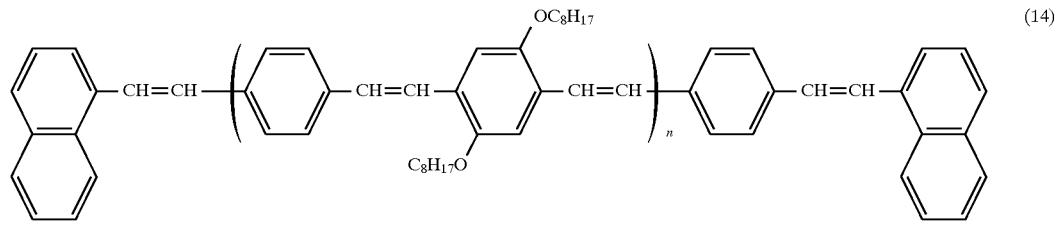

The polystyrene-reduced number-average molecular weight of the polymeric fluorescent substance 1 was 2.56× $10^3$. The number-average polymerization degree n as determined from the polystyrene-reduced number-average molecular weight was 4.7. In the polymeric fluorescent substance 1, addition of a naphthyl group was confirmed from the absence of aldehyde signals on the $^1$H-NMR spectrum.

(Measurement of absorption spectrum and fluorescence spectrum and evaluation of quantum yield of fluorescence]

The polymeric fluorescent substance 1 could easily be dissolved in chloroform. A 0.2% chloroform solution of this polymeric fluorescent substance was spin-coated on a quartz plate to form a thin film of said polymer. The ultraviolet-visible light absorption spectrum and fluorescence spectrum of this thin film were measured by Spectrophotometer UV 365 of Shimadzu Seisakusho K. K. and Fluorospectrophotometer 850 of Hitachi Ltd. The fluorescence spectrum of the film when excited at 410 nm was used for calculation of quantum yield of fluorescence. Intensity of fluorescence was obtained as a relative value determined by dividing the area of fluorescence spectrum plotted with abscissa used for wave number, by an absorbance at 410 nm. The fluorescence intensity of the polymeric fluorescent substance 1 was high as seen from Table 1.

EXAMPLE 2

[Synthesis of polymeric fluorescent substance]

Synthesis, washing and reprecipitation were conducted in the same manner as in Example 1 except that 2.14 parts by weight of a phosphonium salt obtained from 4-methoxybenzyl chloride instead of 9-chloromethylnaphthalene and the polymeric fluorescent substance A were dissolved in toluene alone, whereby 0.84 parts by weight of a polymer was obtained. This polymer is referred to as polymeric fluorescent substance 2. The repeating unit and its terminal structure of the polymeric fluorescent substance 2 calculated from the feed ratio of the monomers are shown in the following formula (15):

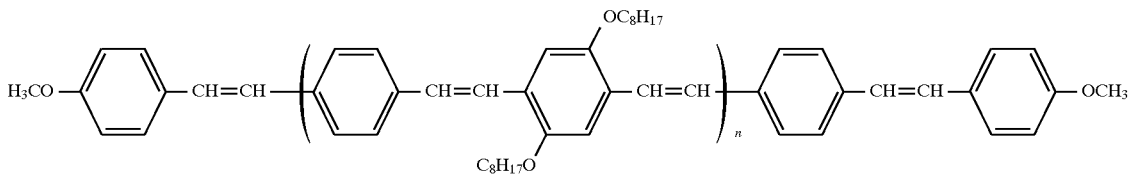

The polystyrene-reduced number-average molecular weight of the polymeric fluorescent substance 2 was $2.51 \times 10^3$. The number-average polymerization degree n as determined from the polystyrene-reduced number-average molecular weight was 4.7. In the polymeric fluorescent substance 2, addition of a methoxyphenyl group was confirmed from the absence of aldehyde signals on the $^1$H-NMR spectrum.

[Measurement of absorption spectrum and fluorescence spectrum and evaluation of quantum yield of fluorescence]

The fluorescence intensity of the polymeric fluorescent substance 2 was determined in the same manner as in Example 1. It was high as seen from Table 1.

COMPARATIVE EXAMPLE 1

[Measurement of absorption spectrum and fluorescence spectrum and evaluation of quantum yield of fluorescence]

The fluorescence intensity of the polymeric fluorescent substance A obtained in Referential Example 1 was determined in the same manner as in Example 1. The fluorescence intensity of the polymeric fluorescent substance A was lower than those of the polymeric fluorescent substances 1 and 2 of Examples 1 and 2 as seen from Table 1.

REFERENTIAL EXAMPLE 2

[Synthesis of polymeric fluorescent substance B]

9.56 parts by weight of the phosphonium salt obtained in Referential Example 1 and 1.34 parts by weight of terephthalaldehyde were dissolved in chloroform. To the solution was dropwise added an ethyl alcohol solution containing 1.56 parts by weight of lithium ethoxide. The mixture was polymerized at room temperature for 3 hours and allowed to stand overnight at room temperature. After adding ion exchange water and ethyl alcohol, the solution was concentrated and dissolved in chloroform. Ethyl alcohol was added to the solution for reprecipitation. The resulting precipitate was dried under reduced pressure to obtain 4.20 parts by weight of a polymer. This polymer is referred to as polymeric fluorescent substance B.

$^1$H-NMR spectrum of the polymeric fluorescent substance B showed faint presence of aldehyde signals.

The repeating unit and its terminal structure of the polymeric fluorescent substance B were the same as those of the polymeric fluorescent substance A shown in the formula (13), but the polystyrene-reduced number-average molecular weight of the polymeric fluorescent substance B was $9.90 \times 10^3$. The number-average polymerization degree n of the polymeric fluorescent substance B as determined from the polystyrene-reduced number-average molecular weight was 21.1.

EXAMPLE 3

[Synthesis of polymeric fluorescent substance 3]

Synthesis, washing and reprecipitation were conducted in the same manner as in Example 1 using 0.50 parts by weight of a phosphonium salt obtained from 9-chloromethylnaphthalene and 0.45 parts by weight of the polymeric fluorescent substance B, whereby 3.49 parts by weight of a polymer was obtained. This polymer is referred to as polymeric fluorescent substance 3. The repeating unit and its terminal structure of the polymeric fluorescent substance 3 were the same as those of the polymeric fluorescent substance 1 shown in the formula 14.

The polystyrene-reduced number-average molecular weight of the polymeric fluorescent substance 3 was $1.14 \times 10^4$. The number-average polymerization degree n as determined from the polystyrene-reduced number-average molecular weight was 23.7. The absence of aldehyde signals on the $^1$H-NMR spectrum confirmed addition of a naphthyl group.

[Measurement of absorption spectrum and fluorescence spectrum and evaluation of quantum yield of fluorescence]

The fluorescence intensity of the polymeric fluorescent substance 3 was determined in the same manner as in Example 1. It was strong as seen from Table 1.

COMPARATIVE EXAMPLE 2

[Measurement of absorption spectrum and fluorescence spectrum and evaluation of quantum yield of fluorescence]

The fluorescence intensity of the polymeric fluorescent substance B was determined in the same manner as in Example 3. It was lower than that of the polymeric fluorescent substance 3 of Example 3 as seen from Table 1.

TABLE 1

| | Quantum yield of fluorescence (arbitrary unit) |
|---|---|
| Polymeric fluorescent substance 1 | 20.3 |
| Polymeric fluorescent substance 2 | 14.2 |
| Polymeric fluorescent substance A | 8.7 |
| Polymeric fluorescent substance 3 | 8.5 |
| Polymeric fluorescent substance B | 4.9 |

REFERENTIAL EXAMPLE 3

[Synthesis of polymeric fluorescent substance C]

In an ethanol/chloroform mixed solvent were dissolved 9.56 parts by weight of the phosphonium salt obtained in Referential Example 1, 0.6 parts by weight of isophthalaldehyde and 0.6 parts by weight of terephthalaldehyde. To this solution was dropwise added an ethyl alcohol solution containing 1.08 parts by weight of lithium ethoxide. The mixture was polymerized at room temperature for 3 hours and allowed to stand overnight at room temperature. Ion exchange water and ethyl alcohol were added to the solution to cause precipitation. The precipitate was dissolved in chloroform, and ethyl alcohol was added to the solution for reprecipitation. The resulting precipitate was dried under reduced pressure to obtain 2.37 parts by weight of a polymer. This polymer is referred to as polymeric fluorescent substance C.

The repeating units of the polymeric fluorescent substance C are shown in the following formulae (16) and (17), and the terminal structure of the repeating units is shown in the following formula (18). Because of the starting materials and the reaction mechanism, the aldehyde group of the terminal structure is not bonded to a vinylene group of the formula (16) or (17) but is bonded to a phenyl group.

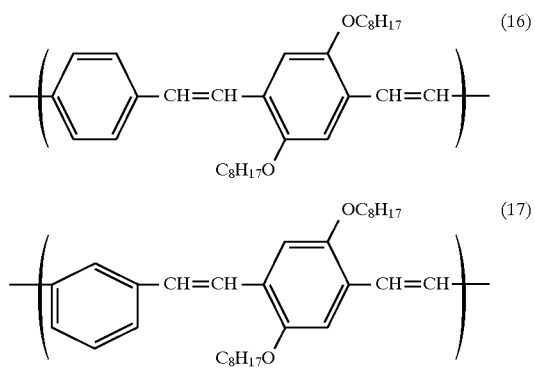

EXAMPLE 4

[Synthesis of polymeric fluorescent substance 4]

In an ethanol/chloroform mixed solvent were dissolved 10.6 parts by weight of the phosphonium salt (I) obtained in Referential Example 1, 0.6 parts by weight of isophthalaldehyde and 0.6 parts by weight of terephthalaldehyde. To this solution was dropwise added an ethyl alcohol solution containing 1.17 parts by weight of sodium ethoxide, and the mixture was polymerized. To the reaction solution was added a chloroform solution containing 1.8 parts by weight of 1-pyrenecarbaldehyde, and then added an ethyl alcohol solution containing 1.17 parts by weight of sodium ethoxide. The mixture was polymerized at room temperature for 3 hours and allowed to stand overnight at room temperature. The produced precipitate was recovered, washed with ethanol, then with an ethanol/water mixed solvent and further with ethanol, and dissolved in toluene. To this solution was added ethyl alcohol for reprecipitation. The produced precipitate was dried under reduced pressure to obtain 2.50 parts by weight of a polymer. This polymer is referred to as polymeric fluorescent substance 4. The polymer was again dissolved in toluene and ethyl alcohol was added thereto for additional reprecipitation.

From the starting materials and the reaction mechanism, the repeating units of the polymeric fluorescent substance 4 were determined to be as shown in the formulae (16) and (17), and the terminal structure thereof was 1-pyrenyl.

The polystyrene-reduced number-average molecular weight of the polymeric fluorescent substance 4 as determined by GPC was $2.9 \times 10^3$. The structure of the polymeric fluorescent substance 4 was confirmed by the IR absorption spectrum and $^1$H-NMR.

[Manufacture and evaluation of EL device]

On a glass substrate having a 40-nm thick ITO film formed by sputtering was dip-coated a 1.0% by weight chloroform solution of poly(N-vinylcarbazole) [hereinafter referred to as PVCz] to form an 80-nm thick film on said substrate. Thereon was spin-coated a 1.0% by weight toluene solution of the polymeric fluorescent substance 4 to form a 50-nm thick film. The coating film was dried in vacuo at 150° C. for one hour. Thereon was vapor-deposited tris(8-quinolinol)aluminum (Alq$_3$) at a rate of 0.1–0.2 nm/s to form a 70-nm thick electron transport layer. Lastly, an aluminum-lithium alloy (Al:Li=100:1 by weight) was vapor-deposited thereon as a cathode to a thickness of 100 nm to make an organic EL device. The degree of vacuum in vapor deposition was below $8 \times 10^{-6}$ Torr in all cases.

When a voltage of 8.2 V was applied to this device, a flow of electricity with a current density of 2.5 mA/cm$^2$ was induced and a yellowish green electro-luminescence with a luminance of 233 cd/m$^2$ was observed. In this case, the luminous efficiency was 9.32 cd/A. The luminance was almost proportional to the current density.

When this device was continuously driven at a constant current density of 2.5 mA/cm$^2$, the initial voltage and luminance were 8.3 V and 233 cd/m$^2$, respectively, but 200 hours later, the voltage was 11.3 V and the luminance reduced to 165 cd/m$^2$, and 500 hours layer, the voltage was 12.9 V and the luminance dropped to 138 cd/m$^2$. When the data were ploted with the time elapsed as abscissa and the luminance as ordinate on a logarithmic scale, the decreasing rate of luminance lessened with time and its change has become substantially rectilinear after passage of 400 hours. The service life was estimated by extrapolating the linear portion of the drop of luminance on the logarithmic scale and measuring the time when the luminance dropped to the half of the initial luminance. The service life was estimated to be approximately 1,000 hours.

COMPARATIVE EXAMPLE 3

(Manufacture and evaluation of EL device]

An EL device was manufactured in the same manner as in Example 4 except that the polymeric fluorescent substance C was used in place of the polymeric fluorescent substance 4. When a voltage of 10.3 V was applied to this device, a flow of electricity with a current density of 2.5 mA/cm$^2$ was induced and a yellowish green electroluminescence with a luminance of 170 cd/m$^2$ was observed. In this case, the luminous efficiency was 6.8 cd/A. The luminance was almost proportional to the current density.

When this device was continuously driven at a constant current density of 2.5 mA/cm$^2$, the initial luminance was 170 cd/m$^2$, but 150 hours later, it reduced by half.

TABLE 2

|  | Voltage (V) | Current density (mA/cm$^2$) | Luminance (cd/m$^2$) | Luminous efficiency (cd/A) | Service life (hr) |
| --- | --- | --- | --- | --- | --- |
| Polymeric fluorescent substance 4 | 8.2 | 2.5 | 233 | 9.32 | 1000 |
| Polymeric fluorescent substance C | 10.0 | 2.5 | 170 | 6.80 | 150 |

As is seen from the above results, the organic EL device manufactured using the polymeric fluorescent substance 4 of Example 4 showed better EL characteristics, such as far higher luminous efficiency and longer service life, than the organic EL device made by using the polymeric fluorescent substance C of Comparative Example 3.

EXAMPLE 5

[Synthesis of polymeric fluorescent substance 5]

The procedure of Example 4 was carried out except that 1.61 parts by weight of 9-anthraldehyde was used in place of 1-pyrenecarbaldehyde to obtain 1.5 parts by weight of a polymeric fluorescent substance 5.

The repeating units of the polymeric fluorescent substance 5 as assumed from the type of the monomers fed and the reaction procedure were as shown in the formulae (16) and (17) and their terminal structure was 9-anthryl.

The polystyrene-reduced number-average molecular weight of the polymeric fluorescent substance 5 as determined by GPC was 2.7×10$^3$. The structure of the polymeric fluorescent substance 5 was confirmed by the IR absorption spectrum and $^1$H-NMR.

[Manufacture and evaluation of EL device]

When this device was drived at a constant current density of 2.5 mA/cm$^2$, the initial luminance was 82.5 cd/m$^2$. The reducing rate of luminance diminished with time. The service life was estimated to be approximately 600 hours from the same method of estimation as used in Example 4.

EXAMPLE 6

[Synthesis of polymeric fluorescent substance 6]

The procedure of Example 4 was followed except for use of 2-fluorenecarbaldehyde in place of 1-pyrenecarbaldehyde to obtain a polymeric fluorescent substance 6.

The $^1$H-NMR spectrum of the polymeric fluorescent substance 6 showed no signals specific to the aldehyde group.

The repeating units of the polymeric fluorescent substance 6 assumed from the monomer feed rate and the reaction procedure were as shown in the formulae (16) and (17) and their terminal structure was 2-fluorenyl.

The polystyrene-reduced number-average molecular weight of the polymeric fluorescent substance 6 as determined by GPC was 3.0×10$^3$. The structure of the polymeric fluorescent substance 6 was confirmed by the IR absorption spectrum and $^1$H-NMR.

[Manufacture and evaluation of EL device]

An organic EL device was manufactured in the same manner as in Example 4 except for use of the polymeric fluorescent substance 6 in place of the polymeric fluorescent substance 4.

When this device was driven at a constant current density of 2.5 mA/cm$^2$, the initial luminance was 171 cd/m$^2$. The lowering rate of luminance lessened with time. The service life was estimated to be approximately 250 hours from the same method of estimation as used in Example 4.

EXAMPLE 7

[Synthesis of polymeric fluorescent substance 7]

The procedure of Example 4 was repeated except for use of 2-quinolinecarbaldehyde in place of 1-pyrenecarbaldehyde to obtain a polymeric fluorescent substance 7.

The $^1$H-NMR spectrum of the polymeric fluorescent substance 7 showed no signals specific to the aldehyde group.

The repeating units of the polymeric fluorescent substance 7 assumed from the starting materials and the reaction mechanism were as shown in the formulae (16) and (17), and their terminal structure was 1-quinolyl.

The polystyrene-reduced number-average molecular weight of the polymeric fluorescent substance 7 as determined by GPC was 3.0×10$^3$. The structure of the polymeric fluorescent substance 7 was confirmed from the IR absorption spectrum and $^1$H-NMR.

[Manufacture and evaluation of EL device]

An organic EL device was manufactured in the same manner as in Example 4 except for use of the polymeric fluorescent substance 7 in place of the polymeric fluorescent substance 4.

When this device was driven as a constant current density of 2.5 mA/cm$^2$, the initial luminance was 132 cd/m$^2$. The lowering rate of luminance lessened with time. The service life was estimated to be approximately 200 hours from the same method of estimation as used in Example 4.

EXAMPLE 8

[Synthesis of polymeric fluorescent substance 8]

The procedure of Example 4 was followed except for use of 1.06 parts by weight of 4-methoxybenzaldehyde in place of 1-pyrenecarbaldehyde to obtain 1.2 parts by weight of a polymeric fluorescent substance 8. The $^1$HNMR spectrum of the polymeric fluorescent substance 8 showed no signals specific to the aldehyde group.

The repeating units of the polymeric fluorescent substance 8 assumed from the starting materials and the reaction mechanism were as shown in the formulae (16) and (17), and their terminal structure was 4-methoxyphenyl.

The polystyrene-reduced number-average molecular weight of the polymeric fluorescent substance 8 as determined by GPC was 4.0×10$^3$. The structure of the polymeric fluorescent substance 8 was confirmed from the IR absorption spectrum and $^1$H-NMR.

[Manufacture and evaluation of EL device]

An organic EL device was manufactured in the same manner as in Example 4 except for use of the polymeric fluorescent substance 8 in place of the polymeric fluorescent substance 4.

When this device was driven at a constant current density of 2.5 mA/cm$^2$, the initial luminance was 187 cd/m$^2$. The lowering rate of luminance lessened with the elapse of time. From the same method of estimation as used in Example 4, the service life of the device was estimated to be approximately 350 hours.

TABLE 3

|  | Current density (mA/cm$^2$) | Luminance (cd/m$^2$) | Service life (hr) |
|---|---|---|---|
| Polymeric fluorescent substance 5 | 2.5 | 82.5 | 600 |
| Polymeric fluorescent substance 6 | 2.5 | 171 | 250 |
| Polymeric fluorescent substance 7 | 2.5 | 132 | 200 |
| Polymeric fluorescent substance 8 | 2.5 | 187 | 350 |
| Polymeric fluorescent substance C | 2.5 | 170 | 150 |

As is seen from the above results, any of the organic EL devices manufactured by using the polymeric fluorescent substances 5–8 of Examples 5–8 showed better EL performances, such as longer service life, than the organic EL device using the polymeric fluorescent substance C of Comparative Example 3.

EXAMPLE 9

[Synthesis of polymeric fluorescent substance 9]

The procedure of Example 4 was followed except that 1.2 parts by weight of terephthalaldehyde alone was used instead of using terephthalaldehyde and isophthalaldehyde to obtain 2.0 parts by weight of a polymeric fluorescent substance 9.

The repeating unit of the polymeric fluorescent substance 9 assumed from the starting materials and the reaction mechanism was as shown in the formula (16) and its terminal structure was 1-pyrenyl.

The polystyrene-reduced number-average molecular weight of the polymeric fluorescent substance 9 as determined by GPC was 2.6×10$^3$. The structure of the polymeric fluorescent substance 9 was confirmed from the IR absorption spectrum and $^1$H-NMR.

[Manufacture and evaluation of EL device]

An organic EL device was manufactured in the same manner as in Example 4 except for use of the polymeric fluorescent substance 9 in place of the polymeric fluorescent substance 4.

When this device was driven at a constant current density of 2.5 mA/cm$^2$, the initial luminance was 149 cd/m$^2$. The lowering rate of luminance lessened with the elapse of time. The service life was estimated to be approximately 1,000 hours from the same method of estimation as used in Example 4.

EXAMPLE 10

[Synthesis of polymeric fluorescent substance 10]

The procedure of Example 9 was followed except for use of 1.06 parts by weight of 4-methoxybenzaldehyde in place of 1-pyrenecarbaldehyde to obtain 1.2 parts by weight of a polymeric fluorescent substance 10.

The $^1$H-NMR spectrum of the polymeric fluorescent substance 10 showed no signals specific to the aldehyde group.

The repeating units of the polymeric fluorescent substance 10 assumed from the starting materials and the reaction mechanism were as shown in the formula (16), and their terminal structure was 4-methoxyphenyl.

The polystyrene-reduced number-average molecular weight of the polymeric fluorescent substance 10 as determined by GPC was 4.0×10$^3$. The structure of the polymeric fluorescent substance was confirmed from the IR absorption spectrum and $^1$H-NMR.

[Manufacture and evaluation of EL device]

An organic EL device was manufactured in the same way as in Example 4 except for use of the polymeric fluorescent substance 10 in place of the polymeric fluorescent substance 4.

When this device was driven at a constant current density of 2.5 mA/cm$^2$, the initial luminance was 180 cd/m$^2$. The lowering rate of luminance lessened with the elapse of time. The service life of the device was estimated to be approximately 400 hours from the same method of estimation as used in Example 4.

COMPARATIVE EXAMPLE 4

[Manufacture and evaluation of EL device]

An organic EL device was manufactured in the same manner as in Example 4 except for use of the polymeric fluorescent substance B in place of the polymeric fluorescent substance 4.

When this device was driven at a constant current density of 2.5 mA/cm$^2$, the initial luminance was 172 cd/m$^2$. The lowering rate of luminance lessened with the elapse of time. The service life of the device was estimated to be approximately 300 hours from the same method of estimation as used in Example 4.

TABLE 4

|  | Current density (mA/cm$^2$) | Luminance (cd/m$^2$) | Service life (hr) |
|---|---|---|---|
| Polymeric fluorescent substance 9 | 2.5 | 149 | 1000 |
| Polymeric fluorescent substance 10 | 2.5 | 180 | 400 |
| Polymeric fluorescent substance B | 2.5 | 172 | 300 |

As is seen from the above results, any of the organic EL devices manufactured by using the polymeric fluorescent substances 9–10 of Examples 9–10 showed better EL performances, such as longer service life, than the organic EL device using the polymeric fluorescent substance B of Comparative Example 4.

The polymeric fluorescent substance according to the present invention has a strong fluorescence, is soluble in organic solvents and also has excellent stability, so that it can be used as a light emitting material for the organic EL devices, a dyestuff for dye laser, etc.

The organic EL devices using the polymeric fluorescent substance of the present invention are easy to manufacture, show an excellent luminescent property and also have a long life, so that they can be favorably used, for example, as a flat light source for backlight of liquid crystal displays and various display devices such as flat panel display.

What is claimed is:

1. A polymeric fluorescent substance which emits a fluorescence in a solid state, comprising (A) at least one repeating unit represented by the following formula (1):

$$—Ar_1—CR_1=CR_2— \quad (1)$$

wherein $Ar_1$ is an arylene group or a heterocyclic compound group having 4–20 carbon atoms taking part in conjugated bonds; $R_1$ and $R_2$ are each independently a group selected from the group consisting of a hydrogen atom, an alkyl group of 1–20 carbon atoms, an aryl group of 6–20 carbon atoms, a heterocyclic compound group of 4–20 carbon atoms and a cyano group, with the amount of the formula (1) repeating units being at least 50 mole % based on the total repeating units, and with (B) a monofunctional group represented by the following formula (2) present on at least one terminal:

$$—CR_3=CR_4—Ar_2 \qquad (2)$$

wherein $Ar_2$ is an aryl group or a heterocyclic compound group having 4–50 carbon atoms taking part in conjugated bonds; $R_3$ and $R_4$ are each independently a group selected from the group consisting of a hydrogen atom, an alkyl group of 1–20 carbon atoms, an aryl group of 6–20 carbon atoms, a heterocyclic compound group of 4–20 carbon atoms and a cyano group, and having a polystyrene-reduced number-average molecular weight of $10^3$–$10^7$.

2. A process for producing the polymeric fluorescent substance of claim 1, which comprises polymerizing at least one monomer represented by the following formula (3) to obtain a polymer:

$$G_1—Ar_2—G_2 \qquad (3)$$

wherein $Ar_1$ is an arylene group or a heterocyclic compound group having 4–20 carbon atoms taking part in conjugated bonds; $G_1$ and $G_2$ are each independently a group selected from the group consisting of a hydrogen atom, an alkyl group of 1–20 carbon atoms, an aryl group of 6–20 carbon atoms, a heterocyclic compound group of 4–20 carbon atoms and a cyano group, said groups $G_1$ and $G_2$ each forming a carbon-carbon double bond in the polymerization and reacting the obtained polymer with a compound of the following formula (4):

$$G_3—Ar_2 \qquad (4)$$

wherein $Ar_2$ is an arylene group or a heterocyclic compound group having 4–50 carbon atoms taking part in conjugated bonds; $G_3$ is a group selected from the group consisting of a hydrogen atom, an alkyl group of 1–20 carbon atoms, an aryl group of 6–20 carbon atoms, a heterocyclic compound group of 4–20 carbon atoms and a cyano group, said group $G_3$ being reacted with $G_1$, $G_2$ or a mixture of $G_1$ and $G_2$ of the formula (3) to form a carbon-carbon double bond.

3. An organic electroluminescence device comprising a pair of electrodes consisting of an anode and a cathode at least one of which electrodes is transparent or semitransparent and at least a light emitting layer between said electrodes, said light emitting layer comprising a polymeric fluorescent substance of claim 1.

4. An organic electroluminescence device according to claim 3, wherein a layer comprising an electron transport compound is provided between the cathode and the light emitting layer in adjacency to the light emitting layer.

5. An organic electroluminescence device according to claim 3, wherein a layer comprising a hole transport compound is provided between the anode and the light emitting layer in adjacency to the light emitting layer.

6. An organic electroluminescence device according to claim 3, wherein a layer comprising an electron transport compound is provided between the cathode and the light emitting layer in adjacency to the light emitting layer, and a layer comprising a hole transport compound is provided between the anode and the light emitting layer in adjacency to the light emitting layer.

* * * * *